United States Patent [19]
Hamilton et al.

[11] 3,771,292
[45] Nov. 13, 1973

[54] AIR DRIER AND CLEANER

[75] Inventors: Norman V. Hamilton; Ronald Lehoux, both of Timmins, Ontario, Canada

[73] Assignee: Hamlou Limited, Timmins, Ontario, Canada

[22] Filed: Apr. 14, 1971

[21] Appl. No.: 133,866

[30] Foreign Application Priority Data
Apr. 21, 1970 Canada .................................. 80658

[52] U.S. Cl. ........................ 55/345, 55/419, 55/458, 55/460, 55/461, 55/466
[51] Int. Cl. ........................................... B01d 45/12
[58] Field of Search ........................ 55/92, 235–238, 55/348, 349, 419, 452, 458, 459, 460, 461, 466; 261/79 A

[56] References Cited
UNITED STATES PATENTS
| 1,847,452 | 3/1932 | Vaughn | 55/238 |
| 3,048,956 | 8/1962 | Lundy et al. | 55/235 |
| 3,273,316 | 9/1966 | Ross | 55/90 |
| 3,641,745 | 2/1972 | Moore | 55/345 |

*Primary Examiner*—Bernard Nozick
*Attorney*—Maybee & Legris

[57] ABSTRACT

Compressed air from a line is passed through a horizontal three-compartment casing in which the sense of swirl of the air is reversed from compartment to compartment, the swirling air passing through a screen which aids in separating water and other foreign matter, the air being returned to the line with its original sense of swirl.

8 Claims, 6 Drawing Figures

PATENTED NOV 13 1973
3,771,292
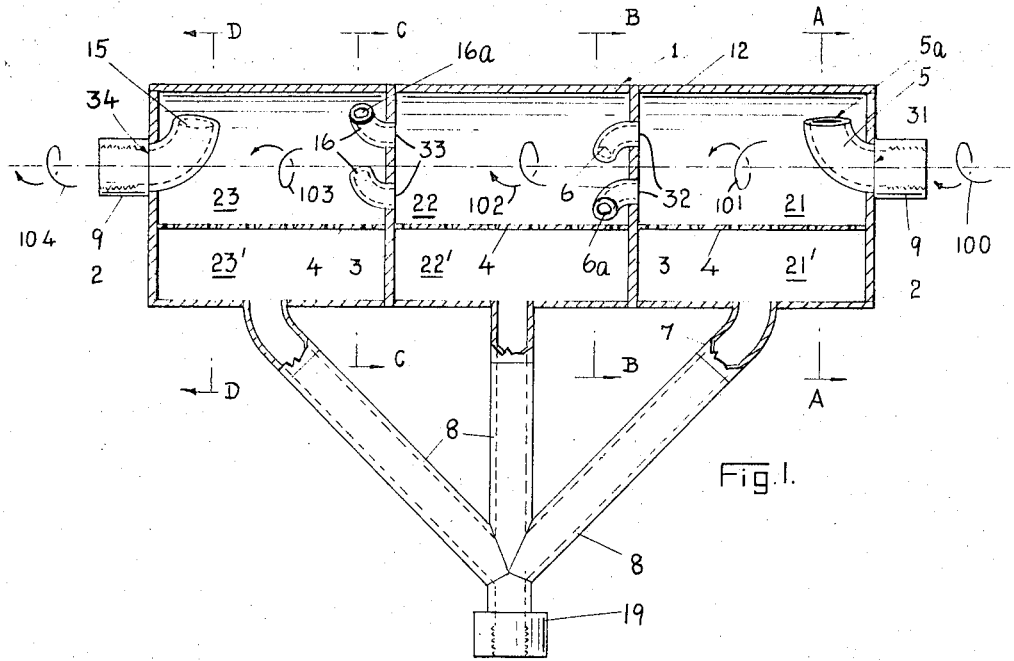
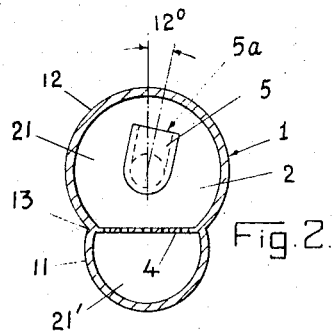
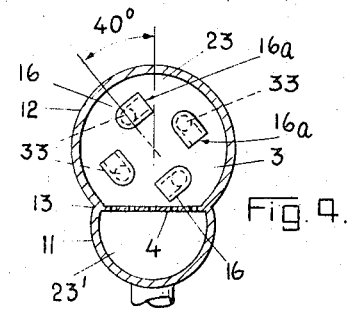
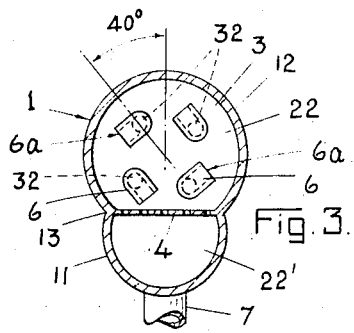
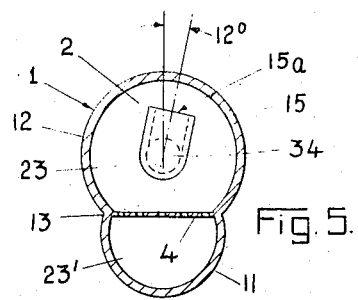
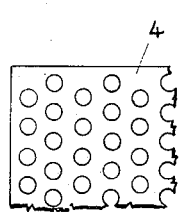
Inventors
Norman V. Hamilton
Ronald Lehoux
By *Maybee & Legris*
Attorneys

AIR DRIER AND CLEANER

BACKGROUND OF THE INVENTION

1. Field of the Invention

This invention relates to the drying and cleaning of compressed air.

2. Description of the Prior Art

Compressed air flows through a compressed air line with a swirling motion, the sense of swirl in the northern hemisphere being clockwise when looking in the direction of travel, or counterclockwise when looking upstream. For many uses it is desirable that the air be relatively free of water and other foreign matter. Compressed air supplied to underground workings in mines, at pressures up to about 125 p.s.i., may accumulate a substantial amount of moisture because of temperature variations, and may also collect grit and rust particles because of the dirty surroundings, abusive treatment of the lines, and the like. Cyclones are well known for drying air at relatively low pressures, but conventional cyclones are of relatively large size and incapable of withstanding the pressures, abrasive action of grit, and other abuses that occur in many mining environments.

SUMMARY OF THE INVENTION

The present invention provides a drier and cleaner that is of relatively simple construction, and that can be compact and rugged. The drier has a number of compartments in which the direction of swirl of the incoming compressed air is varied, the dried air being delivered back to the line with the same sense of swirl as it had when it entered the drier. The drier has no moving parts, is arranged with its axis generally horizontal, and has a screen through which the air, as it swirls, passes downwardly and then upwardly, with discharge of foreign matter below the screen.

BRIEF DESCRIPTION OF THE DRAWINGS

A preferred embodiment of the invention is illustrated in the accompanying drawings in which:

FIG. 1 is a longitudinal section through an air drier and cleaner;

FIG. 2 is a cross-section as seen at A—A in FIG. 1;

FIG. 3 is a cross-section as seen at B—B in FIG. 1;

FIG. 4 is a cross-section as seen at C—C in FIG. 1;

FIG. 5 is a cross-section as seen at D—D in FIG. 1; and

FIG. 6 is a plan view of part of a drier screen.

DESCRIPTION OF THE PREFERRED EMBODIMENT

The drier illustrated consists of a casing having a tubular wall 1 closed at its ends 2 and divided by two transverse partitions 3 into a first chamber 21, a central chamber 22 and a third chamber 23. These chambers are substantially circular in cross-section, and have a common horizontal axis 24. The chambers have downward extensions 21', 22', 23' respectively which distort their circular cross-sections and from which foreign matter can be discharged as described later.

The casing wall 1 is conveniently constructed from a larger upper pipe 12 and a smaller lower pipe 11, these pipes being welded together along lines 13, with a horizontal perforated plate 4 between them to serve as a screen above the extensions 21', 22' and 23'.

Leading to the first compartment 21 is an inlet 31 on the axis 24. By means of a pipe coupling 9 welded to the end wall 2, a compressed air line (not shown) can be connected to deliver compressed air to the inlet 31 and thus into the chambers which are of larger transverse section than the line. The compressed air in the line will normally have a swirling motion indicated by the arrow 100, i.e., counterclockwise when looking upstream. Leading from the line inlet 31, and located within the chamber 21, is a 90° inlet elbow 5.

As shown in FIG. 2, the inlet elbow 5 has its outlet 5a directed radially upwardly into the first chamber 21 at an angle 12° clockwise from the vertical (looking upstream towards the line inlet). This arrangement is found to cause the air to travel through the chamber 21 in a counterclockwise direction (looking downstream) as indicated by the arrow 101 in FIG. 1. The screen 4 extends across the lower part of the casing in the path of the swirling air, being on a chord of the upper and truly circular portion of the chamber 21. Thus the swirling air passes downwardly and then back upwardly through the screen 4. Most of the extension 21' is out of the primarily circular swirling path of the air, and solids and liquids from the air flow through an elbow 7 and pipe 8 leading from the bottom of the chamber 21 to a pipe coupling 19 for connection to a drainage trap or valve.

Above the level of the screen 4 the first partition 3 (between chambers 21 and 22) has four passages 32 which are located at equal intervals on a circle concentric with the axis 24. As seen in FIG. 3, one of the passages 32 is located at an angle 40° counterclockwise (looking upstream) from the vertical, i.e., from 12 o'clock. The passages 32 serve as inlets to 90° elbows 6 which are located in the central chamber 22 and have outlets 6a (FIG. 3) directed tangentially to the circle on which the passages 32 are located. The elbows 6 direct the air into the chamber 22 with a counterclockwise swirl (looking upstream), so that the sense of swirl of the air in chamber 22 is reversed from that in chamber 21, as indicated by the arrow 102. Below the screen 4 in the chamber 22 another discharge pipe 8 leads to the drainage coupling 19.

The second partition 3 (between the chambers 22 and 23) has four passages 33 identical to the passages 32, being located at equal intervals on a circle concentric with the axis 24, all at an elevation higher than the screen 4, one passage 33 being located at an angle 40° counterclockwise from 12 o'clock as seen in FIG. 4. These passages 33 are inlets to elbows 16 in the chamber 23, where the elbow outlets 16a are directed in the sense opposite to the outlets 6a, so as to impart a clockwise swirl to the air as indicated by the arrow 103. For a third time the air swirls through a screen 4, with discharge of foreign matter from the bottom of chamber 23 via a pipe 8 to the drainage coupling 19.

The end wall 2 of the third chamber 23 has an outlet 34 which is on the axis 24 and can be connected to the compressed air line by another coupling 9. For delivering the air in chamber 23 to the line, an outlet elbow 15 extends into the chamber 23, and the inlet 15a to elbow 15 leads radially downwardly at an angle 12° counterclockwise from the vertical when looking upstream (or clockwise from the vertical when looking downstream as in FIG. 5). With this disposition of the outlet elbow 15 the air discharged through the outlet 34 has a swirl in the sense of the arrow 104, i.e., in the same sense as when it entered the inlet 31. If the air were delivered through the outlet with the opposite sense of swirl, it would, flowing in the line, tend to revert to its natural sense (counterclockwise looking upstream in the northern hemisphere), disturbing the flow in the line.

It is found that three chambers 21, 22 and 23 are sufficient to achieve a high degree of purification of compressed air. If further chambers were added, an odd number should be used so that the air emerges with the same sense of swirl as it entered, but it is doubtful that further chambers are necessary for most uses.

Excellent operation is achieved with the preferred unit shown in the drawings even if the air pressure varies considerably. The unit illustrated has no moving parts to wear out, has no filtering media to change, and does not require adjustment. It can be of all welded steel construction, capable of withstanding high pressures and the abrasive action of solids that may be carried by the incoming air.

The angles shown in FIGS. 2, 3 and 4 are found to be suitable for a unit having the following dimensions:

Chambers 21, 22 and 23 . . . 3 inches radius about axis 24.
Inlet 31 and outlet 34 . . . 2 inches diameter.
Passages 32 and 33 . . . ½ inch diameter.

The plate 4 preferably has holes of ¼ inch diameter spaced apart as shown in FIG. 6. Solids carried by the incoming air pass down through these holes and tend to be trapped under the screen 4. Particles of scale or other solids larger than the holes tend to be broken up by the swirling action above the screen before passing through it, and thus do not clog the drainage system. The screen should be of sturdy construction with holes sufficiently large that they do not become plugged by solids normally encountered in the line, for example by moist sand and grit that sometimes finds its way into compressed air lines in mines.

The 12° angle shown in FIG. 2 for the elbow 5 is not critical. To achieve the desired sense of swirl in the chamber 21 the outlet 5a could, as viewed in FIG. 2, be directed anywhere from about 1 o'clock to about 4 o'clock; beyond 4 o'clock it would be directed at the screen 4 rather than above it. The same applies to the inlet 15a as viewed in FIG. 5 (i.e., looking downstream); putting it otherwise, looking upstream the inlet 15a could be disposed in the angle between about 11 o'clock and 8 o'clock so as to be directed towards the chamber wall above the screen.

The 40° angles shown in FIGS. 3 and 4 are not critical, but it is to be noted that each elbow 6, having its outlet disposed generally tangentially, is aimed to direct air between the next elbow 6 and the chamber wall, and thus past the outlet 6a of the next elbow, and this creates a suction helping to draw the air from chamber 21 into chamber 22. The elbows 16 accomplish a similar action. The total area of the four passages 32 is less than the area of the inlet 31; in the example illustrated, the four passages 32 are approximately one-half inch in diameter, so that their total area is about 0.785 sq. in., whereas the area of the 2 inches diameter inlet 31 is about 3.14 sq. in. The air therefore flows through the elbows 6 at relatively high velocity, and the elbows should be of heavy duty construction to withstand the abrasive action of any solids carried in the air.

If it is desired to connect the drainage coupling 19 to a conventional air-operated moisture trap, the flushing mechanism of the trap can trip a valve to allow a shot of air into the trap from the casing 1 through a nipple 10. If simple gravity drainage from a trap or valve is desired, however, the nipple 10 is not required and can be plugged, or a gauge can be connected thereto.

What we claim as our invention is:

1. A drier and cleaner for a compressed air line through which the air, which may carry abrasive particles, travels with a swirling motion in a predetermined sense, comprising a casing having ends spaced apart on a generally horizontal axis, one end having a line inlet and the other end having a line outlet whereby the casing can be connected in the line, a plurality of partitions dividing the casing transversely into a plurality of generally cylindrical chambers through which the air can pass successively from the line inlet to the line outlet, the chambers being of larger transverse section than the line, stationary air directing means at the line outlet for causing the air passing to the outlet to swirl in said predetermined sense, stationary air directing means in the partitions directing the air away from said axis to swirl in opposite senses in successive chambers, a screen extending chordwise across the lower part of each chamber and through which the swirling air in the chamber passes downwardly and then upwardly, and below the screen a discharge for liquid and solid matter removed from the air.

2. A drier and cleaner as claimed in claim 1, wherein the stationary air directing means in the partitions comprise elbows through which the air passes from one chamber to the next.

3. A drier and cleaner as claimed in claim 2, wherein each elbow has an outlet aimed to direct air between the chamber wall and the next elbow to create a suction at the outlet of said next elbow.

4. A drier and cleaner for a compressed air line through which the air travels with a swirling motion in a predetermined sense, comprising a casing having a first and a second transverse partition dividing the casing into a first, a central and a third chamber each of substantially circular cross-section and having a common generally horizontal axis, an inlet elbow in the first chamber having a line inlet on said axis and an outlet directing the air to flow through the first chamber with a swirling motion in the sense opposite to said predetermined sense, a plurality of elbows in the central chamber having inlets through the first partition disposed around said axis and having outlets directing the air to flow through the central chamber in said predetermined sense, a plurality of elbows in the third chamber having inlets through the second partition disposed around said axis and having outlets directing the air to flow through the third chamber in said opposite sense, an outlet elbow in the third chamber having a line outlet on said axis and disposed to deliver air from the third chamber to the line outlet with said predetermined sense of swirling motion, each chamber having, at a level below said elbows, a generally horizontal screen in the path of the swirling air and, below the screen and out of the path of the air, a discharge for matter removed from the air.

5. A drier and cleaner as claimed in claim 4 wherein the elbow inlets through the partitions are located at equal intervals on a circle concentric with said axis, and the outlets therefrom are directed generally tangentially to said circles.

6. A drier and cleaner as claimed in claim 5 wherein the total area for flow of air through each partition is less than the area for flow of air through the inlet elbow.

7. A drier and cleaner as claimed in claim 6 wherein, looking upstream, said predetermined sense is counterclockwise, said inlet elbow has its outlet directed at an angle clockwise from the vertical (i.e., 12 o'clock) towards the chamber wall above the screen, and said outlet elbow has its inlet leading radially downwardly from the third chamber at an angle counterclockwise from the vertical and above the screen.

8. A drier and cleaner as claimed in claim 7 wherein the discharge for each chamber comprises a downward extension thereof.

* * * * *